US010762060B1

(12) United States Patent
Faulkner et al.

(10) Patent No.: US 10,762,060 B1
(45) Date of Patent: Sep. 1, 2020

(54) ELECTRONIC FILE MANAGEMENT

(71) Applicant: COMAKE, INC., Atlanta, GA (US)

(72) Inventors: Adler Faulkner, Atlanta, GA (US); Andres Gutierrez, Atlanta, GA (US); Benjamin Rainero De Haan, Atlanta, GA (US)

(73) Assignee: Comake, Inc., Atlanta, GA (US)

( * ) Notice: Subject to any disclaimer, the term of this patent is extended or adjusted under 35 U.S.C. 154(b) by 134 days.

(21) Appl. No.: 16/164,465

(22) Filed: Oct. 18, 2018

Related U.S. Application Data

(60) Provisional application No. 62/573,914, filed on Oct. 18, 2017.

(51) Int. Cl.
| *G06F 17/00* | (2019.01) |
| *G06F 16/182* | (2019.01) |
| *G06F 7/14* | (2006.01) |
| *G06F 16/13* | (2019.01) |
| *G06F 16/16* | (2019.01) |

(52) U.S. Cl.
CPC ............. *G06F 16/183* (2019.01); *G06F 7/14* (2013.01); *G06F 16/137* (2019.01); *G06F 16/168* (2019.01)

(58) Field of Classification Search
CPC .... G06F 16/183; G06F 16/168; G06F 16/137; G06F 7/14
See application file for complete search history.

(56) References Cited

U.S. PATENT DOCUMENTS

| 9,229,942 | B1 * | 1/2016 | MacNeill | G06F 11/1458 |
| 9,559,996 | B1 * | 1/2017 | Clark | H04L 51/08 |
| 9,678,981 | B1 * | 6/2017 | Taylor | G06F 16/122 |
| 9,824,095 | B1 * | 11/2017 | Taylor | G06F 11/1451 |
| 9,852,149 | B1 * | 12/2017 | Taylor | G06F 16/1844 |
| 2002/0194209 | A1 * | 12/2002 | Bolosky | G06F 16/137 |
| 2003/0210278 | A1 * | 11/2003 | Kyoya | G06F 3/0481 715/810 |
| 2004/0046804 | A1 * | 3/2004 | Chang | G06F 3/0482 715/810 |

(Continued)

OTHER PUBLICATIONS

Google Cloud Search. "Create a content connector". 2020. (Year: 2020).*

(Continued)

*Primary Examiner* — Syed H Hasan
(74) *Attorney, Agent, or Firm* — Foley & Lardner LLP

(57) ABSTRACT

Described herein are methods and system for electronic file management having a central server that periodically scans files accessible to multiple computers to identify every file stored onto multiple electronic data repositories. The central server then executes a predetermined protocol to generate a unique identifier for each identified file. The central server then generates an interconnected nodal data structure computer model where each node represents an identified file and where the nodes are linked based on their respective files having similar unique identifiers. The central server periodically scans the electronic data repositories to identify related data. When a related file is identified, the central server modifies the nodal data structure accordingly. When a user requests access to a file, the central server displays all related data to the requested file.

20 Claims, 10 Drawing Sheets

(56) References Cited

U.S. PATENT DOCUMENTS

| | | | | |
|---|---|---|---|---|
| 2004/0215962 | A1* | 10/2004 | Douceur | H04L 9/3236 713/167 |
| 2005/0091595 | A1* | 4/2005 | Shappell | H04L 67/16 715/700 |
| 2005/0198238 | A1* | 9/2005 | Sim | H04L 67/1097 709/222 |
| 2008/0263113 | A1* | 10/2008 | Krishnaiyer | G06F 16/1727 |
| 2008/0307393 | A1* | 12/2008 | Cartledge | G06F 8/71 717/120 |
| 2008/0319987 | A1* | 12/2008 | Takuma | G06F 16/313 |
| 2015/0104114 | A1* | 4/2015 | Bai | G06F 16/51 382/284 |
| 2015/0186538 | A1* | 7/2015 | Yan | G06F 16/2246 707/722 |
| 2018/0159928 | A1* | 6/2018 | Jin | H04L 67/1097 |
| 2019/0138587 | A1* | 5/2019 | Silk | G06F 40/197 |

OTHER PUBLICATIONS

Lodhi. "Top 5 Cloud Duplicate Finder Solutions". 2019. (Year: 2019).*

ELab, Student Agencies and Entrepreneurship at Cornell; Link to Video: <https://protect-eu.mimecast.com/s/5DmuCBLoVcgoKZQh6_d4L>; Published on Apr 30, 2018, Startup Pitch of elab Team Comake at the annual Demo Day held each spring at Cornell University.

Comake: medium—How to Think About Tech as You Start Business School, Oct. 11, 2017, 8 pages.

Comake: medium—Revolutionizing Workflow—Why We Funded Comake, Sep. 25, 2017, 5 pages.

Comake: Comake—The modern file browser—BetaList, Aug. 26, 2017, 7pages.

Comake: Comake—Product Hunt, Aug. 26, 2017, 1 page.

Comake: Comake: Rethinking Your File Browser, Apr. 16, 2017, 8 pages.

Comake: Syracuse, N.Y., Jan. 4, 2017—Student Startup teams from colleges across the country compete for top honors and bragging rights in Student Startup Madness tournament, Jan. 26, 2017, 6 pages.

Comake: Fred Kauber—Work-Work Balance: How Student Entrepreneurs Do Both, Jan. 17, 2017, 7 pages.

Comake: Syracuse, N.Y., Jan. 17, 2017—Student startup teams from colleges and universities across the country compete for top honors and bragging rights in Student Startup Madness tournament, Jan. 17, 2017, 4 pages.

Comake: Kristi Chan—Introducing the New 2016-2017 eLab Teams, Oct. 27, 2016, 6 pages.

Comake: Fred Kauber—Make Your Files Count, Oct. 13, 2016, 12 pages.

Comake: Kathy Hovis—eHub opens doors to first set of student entrepreneurs, Jun. 27, 2016, 3 pages.

* cited by examiner

ELECTRONIC FILE MANAGEMENT

CROSS REFERENCES TO RELATED APPLICATIONS

This application claims priority to U.S. Provisional Application Ser. No. 62/573,914, filed Oct. 18, 2017, which is hereby incorporated by reference in its entirety.

TECHNICAL FIELD

This application relates generally to electronic file management and file mapping.

BACKGROUND

File management systems utilize software to track, manage, and/or store files within different computing environments. Most conventional file management systems are capable of keeping records of various versions and/or related files created or accessed by different users. Utilizing conventional file management systems, users can access and interact with various files within different computing environments. Users can also monitor a revision history of various files. However, conventional file management systems suffer from at least two technical problems. First, conventional file management systems require users to store all files/data on a central electronic data repository (e.g., database, cloud storage, and the like). Storing large volumes of data on a central data repository requires high amount of data storage, which is costly, inefficient, and/or even impractical when working with clients or collaborators that prefer using repositories from competing providers. For instance, managing interrelated files in a central repository requires significant processing power due to number, size, content, and relationships between the files. Online collaborative applications are increasingly emerging where multiple users can simultaneously access, store, share, and edit special online files. Many of these applications come with their own file types, their own file storage, their own messaging or commenting features, and even their own file browser. Ultimately, many people today find themselves in a digital reality defined by content that is highly fragmented. As a result, conventional file management systems either require high processing power, which is costly, or do not monitor the files in a timely manner, which is highly undesirable and inefficient.

Second, conventional file management systems require users to designate related files. For instance, conventional file management systems require users to either tag related files, designate a related project to a file, or name files in accordance with predetermined naming requirements. Therefore, conventional file management systems shift the burden of identifying related files onto users, which is highly undesirable and creates a negative user experience.

SUMMARY

For the aforementioned reasons, there is a need for an electronic file management system and method that can automatically and efficiently identify related files, collect data surrounding the related files, and display the results in real-time or near real-time. There is a need for an electronic file management system that does not require users to manually identify related files, communication, projects, or other context. Furthermore, there is a need for an electronic file management system that does not require users to store all their files in a central electronic data repository.

In an embodiment, a method comprises periodically scanning, by a server, a plurality of electronic data repositories accessible to a plurality of computing devices to identify a plurality of files stored onto the plurality of electronic data repositories where each file is accessible to at least one computing device within the plurality of computing devices; executing, by the server, a predetermined protocol to generate at least one unique identifier of each file within the plurality of files; generating, by the server, a computer model comprising a set of nodes where each node comprises metadata indicating context data of each file within the plurality of files, wherein when a first unique identifier of a first file matches a second unique identifier of a second file, the server merges a first node corresponding to the first file with a second node corresponding to the second file, wherein the merging comprises at least one of linking the first node to the second node and combining the metadata associated with the first node with the metadata associated with the second node; periodically scanning, by the server the plurality of electronic data repositories, to monitor the first file and the second file; for each instance of the server detecting a related file to the first file: merging, by the server, a third node corresponding to the related file to the first file with the first node; and in response to receiving, from an electronic client device, a request to access the first file or the second file, transmitting, by the server, the first file, the identified related file to the first file, and the second file to the electronic client device.

In another embodiment, a computer system comprises a plurality of electronic data repositories storing a plurality of files; a plurality of computing devices in communication with the plurality of electronic data repositories; a server in communication with the plurality of electronic data repositories and the plurality of computing devices, the server configured to: periodically scan the plurality of electronic data repositories to identify a plurality of files stored onto the plurality of electronic data repositories where each file is accessible to at least one computing device within the plurality of computing devices; execute a predetermined protocol to generate at least one unique identifier of each file within the plurality of files; generate a computer model comprising a set of nodes where each node comprises metadata indicating context data of each file within the plurality of files, wherein when a first unique identifier of a first file matches a second unique identifier of a second file, the server merges a first node corresponding to the first file with a second node corresponding to the second file, wherein the merging comprises at least one of linking the first node to the second node and combining the metadata associated with the first node with the metadata associated with the second node; periodically scan, the plurality of electronic data repositories, to monitor the first file and the second file; for each instance of the server detecting a related file to the first file: merge a third node corresponding to the related file to the first file with the first node; and in response to receiving, from an electronic client device, a request to access the first file or the second file, transmit the first file, the identified related file to the first file, and the second file to the electronic client device.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
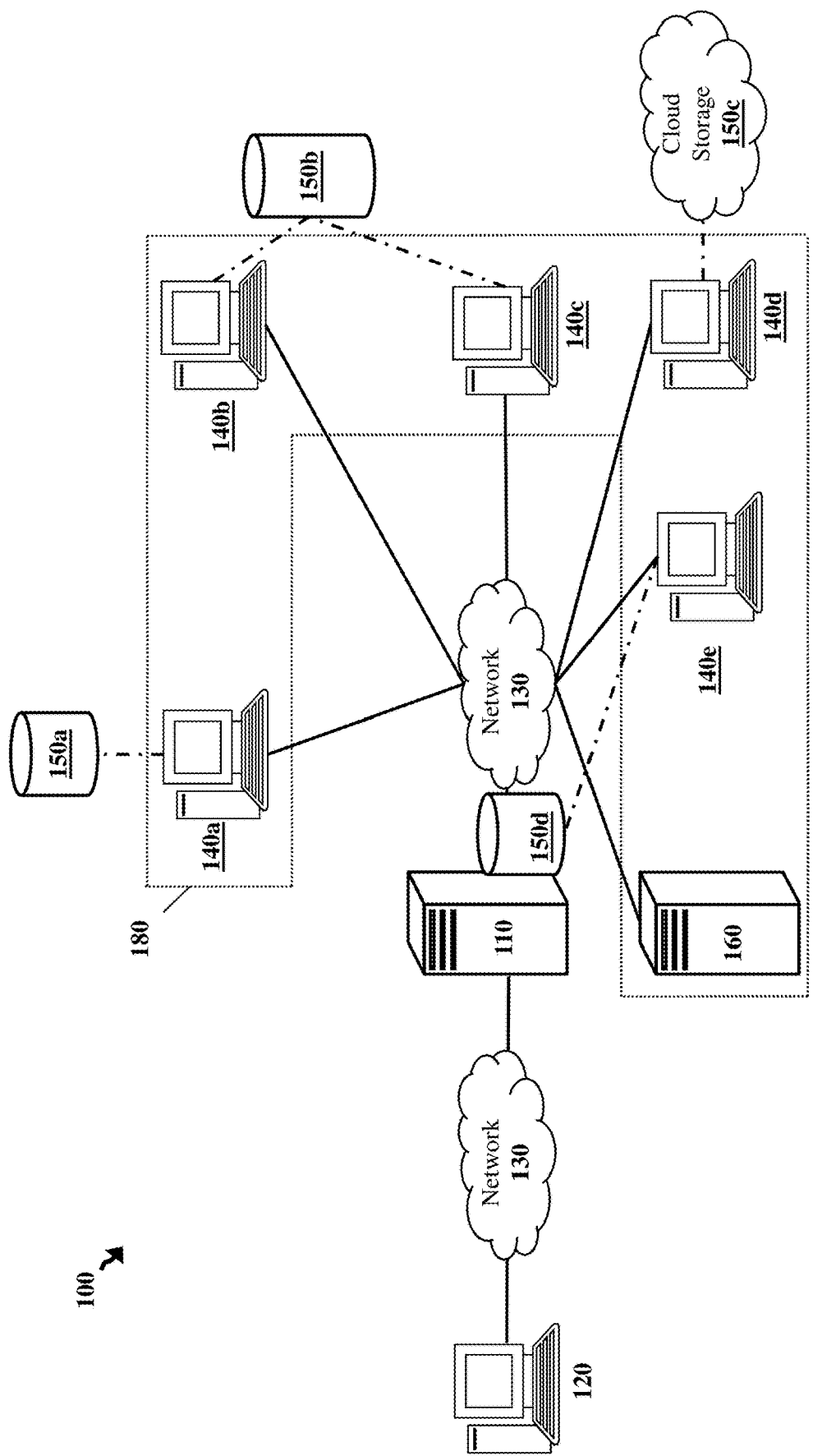
FIG. 1 illustrates components of an electronic file management system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 illustrates components of an electronic file management system 100. The electronic file management system 100 may include an analytics server 110, an administrator computing device 120, user computing devices 140a-e (collectively user computing devices 140), electronic data repositories 150a-d (collectively electronic data repositories 150), and third-party server 160. The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets, or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The electronic file management system 100 is not confined to the components described herein and may include additional or alternate components, not shown for brevity, which are to be considered within the scope of the electronic file management system 100.

Figure 5:
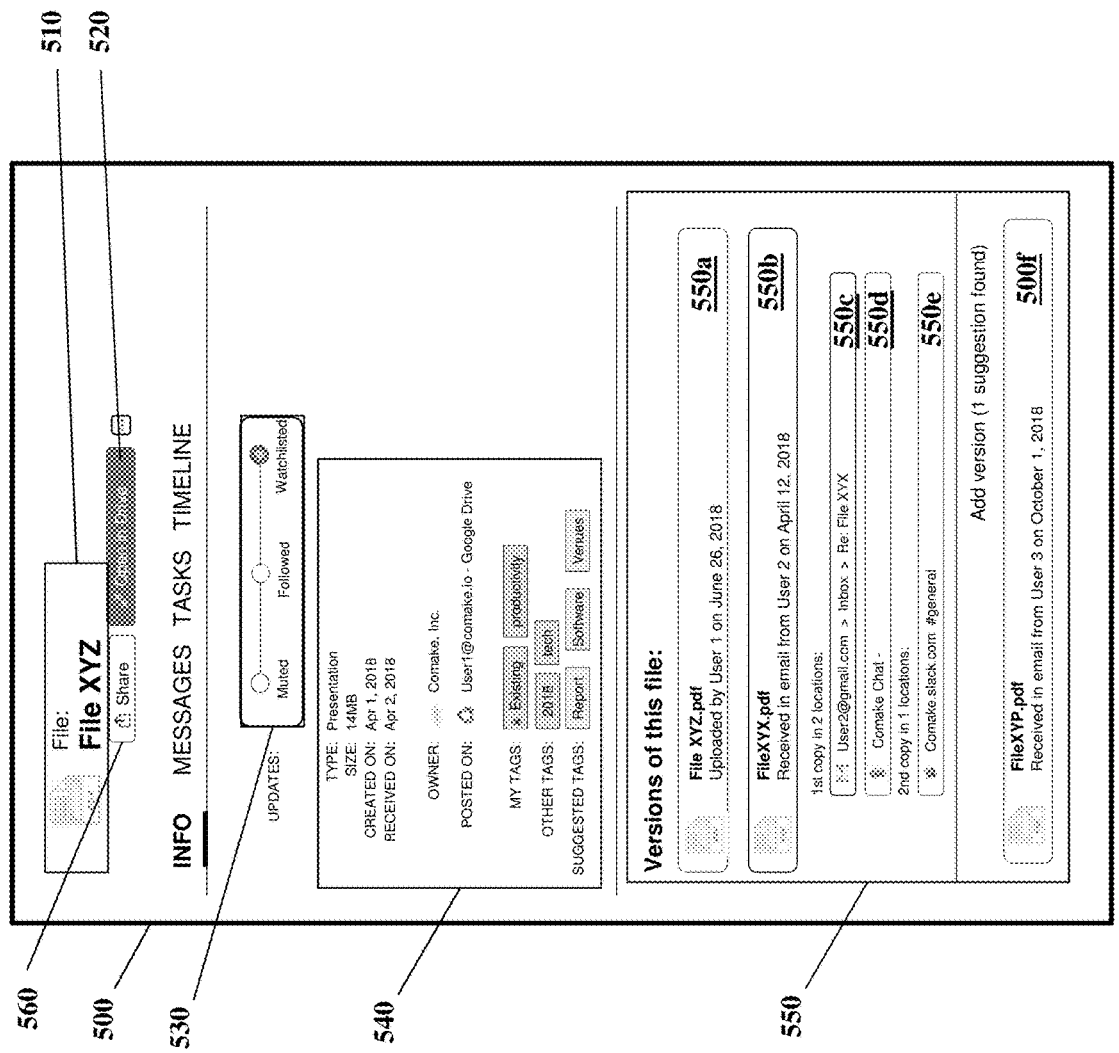
FIG. 5 is a graphical user interface displaying file context information, in accordance with an embodiment.

The analytics server 110 may generate and display a graphical user interface (GUI) on each user computing devices 140 within a network 180. The analytics server 110 may also display the GUI on the administrator computing device 120. An example of the GUI generated and hosted by the analytics server 110 may be a web-based application or a website, as depicted in FIGS. 5, 6, and 7. The analytics server 110 may host a website accessible to end-users, where the content presented via the various webpages may be controlled based upon each particular user's role. The analytics server 110 may be any computing device comprising a processor and non-transitory machine-readable storage capable of executing the various tasks and processes described herein. Non-limiting examples of such computing devices may include workstation computers, laptop computers, server computers, laptop computers, and the like. While the electronic file management system 100 includes a single analytics server 110, in some configurations, the analytics server 110 may include any number of computing devices operating in a distributed computing environment to achieve the functionalities described herein.

The analytics server 110 may execute software applications configured to display the GUI (e.g., host a website), which may generate and serve various webpages to each user computing device 140 and/or the administrator computing device 120. Different users operating the user computing devices 140 may use the website to generate, access, and store data (e.g., files) stored on one or more of the electronic data repositories 150, as described in detail in FIGS. 2, 5, 6, and 7. In some implementations, the analytics server 110 may be configured to require user authentication based upon a set of user authorization credentials (e.g., username, password, biometrics, cryptographic certificate, and the like). In such implementations, the analytics server 110 may access a system database 150d configured to store user credentials, which the analytics server 110 may be configured to reference in order to determine whether a set of entered credentials (purportedly authenticating the user) match an appropriate set of credentials that identify and authenticate the user.

As described herein a file refers to contained data available to at least one operating system and/or at least one software program. A file may contain data, such as text, video, computer program, audio, and the like. Furthermore, a file can also refer to a path associated with data. For example, a file, as used herein, can refer to a traditional file or folder on a local machine, a shortcut to a file/folder on a different machine, and/or a reference to a file/folder in an email message. Another non-limiting example of a file may include a reference to the location of a file/folder by website URL or file/folder path, a file/folder that only exists online or is not traditionally saved to a local machine's normal file. The path may not be accessible through the main system's file browser (e.g., Google Docs®, Evernote Notes®, and the like) that are not typically accessible through a computer's Windows Explorer or MacOS Finder unless explicitly downloaded to a folder in a different format that might lose either functionality or context such as related content and comments). In some configurations, the analytics server 110 may provide an application native to the user computing devices 140 or other electronic devices used by users where users may access the native application using the user computing devices 140 or any other computing devices (e.g., personal electronic devices) to generate, access, store, or otherwise interact with data stored onto the electronic data repositories 150. The native application may be any application that is directly in communication with the analytics server 110. For example, the native application may be a mobile application, cloud-based application, universal GUI, and/or virtual/cloud-based "desktop" where users (upon being authenticated) can access, interact with, and manipulate data stored onto the electronic data repositories 150.

In some configurations, the analytics server 110 may generate and host webpages based upon a particular user's role within the electronic file management system 100 (e.g., administrator, employee, or the employer). In such implementations, the user's role may be defined by data fields and input fields in user records stored in the system database 150*d*. The analytics server 110 may authenticate each user and may identify the user's role by executing an access directory protocol (e.g. LDAP). The analytics server 110 may generate webpage content, access or generate data stored in the electronic data repositories 150, according to the user's role defined by the user record in the system database 150*d*. For instance, a user may be defined as a lower level employee who may not be authorized to view all related content to a particular sensitive file. Therefore, the analytics server 110 may customize the GUI according to the user's authentication level. Furthermore, the analytics server 110 may customize the GUI according to a user's role (e.g., function type). For instance, the analytics server 110 may customize the GUI based on whether a user is a designer or an account manager.

In operation, when instructed by the administrator computing device 120 and/or any user computing device 140, the analytics server 110 may execute various scanning and crawling protocols to identify and map data stored onto each electronic data repository 150. As described below, the analytics server 110 may also execute various predetermined protocols to generate unique identifiers for the above-described files/data, identify related files, create a nodal data structure, periodically scan the electronic data repositories, update the nodal data structure, and display related files and context information on the above-described GUI. In some implementations, the analytics server 110 may incorporate the GUI into a third-party application, such as a third-party email application or a file sharing/management application while preserving the "look and feel" of the third-party application.

In some configurations, the analytics server 110 may compare unique identifiers included in the metadata of each file. For instance, a file may have metadata that includes unique identifiers associated with elements related to the file (e.g., email, tasks, storage location, and the like). In some embodiments, the analytics server 110 may use these unique identifiers to determine whether the file is related to any other files.

User computing devices 140 may be any computing device comprising a processor and a non-transitory machine-readable storage medium capable of performing the various tasks and processes described herein. Non-limiting examples of a user computing device 140 may be a workstation computer, laptop computer, tablet computer, and server computer. As depicted in FIG. 1, the user computing devices 140 may each be operated by a user within the network 180. In a non-limiting example, the network 180 represents an internal network and/or collection of computing devices connected within an entity. For instance, network 180 may represent all computing devices operated by all employees of a company. User computing devices 140 may be internally interconnected via an internal and/or private network of the network 180 (not shown). For instance, a company's intranet or any other private network may connect all the company's computing devices. In FIG. 1, user computing devices 140 are interconnected within the network 180 (e.g., belong to the same company).

Even though the depicted user computing devices 140 are within the same network (e.g., network 180), it is expressly understood that the services provided by the analytics server 110 may not be limited to computers within the same network. For instance, the analytics server 110 may scan files accessible to one or more user computing devices that are not interconnected and are not within the same network. In some other embodiments, the analytics server 110 may only monitor a customized and/or predetermined portion of the computing devices 140. For instance, the administrator computing device 120 may customize a list of user computing device 140 and their corresponding electronic repository 150 to be monitored by the analytics server 110.

Each user computing device 140 may access one or more electronic data repositories 150 to access (e.g., view, delete, save, revise, share, send, communicate around, and the like) data stored onto the one or more electronic data repositories 150. For instance, user computing device 140*a* may access data within a local database 150*a*. User computing device 140*b* and 140*c* may access a shared database 150*b*. User computing device 140*d* may access a cloud storage 150*c*. Furthermore, user computing device 140*e* may access a database operationally managed by the analytics server 110, such as the system database 150*d*. The network 180 may also include the third-party server 160 where one or more user computing devices 140 utilize the third-party server 160 to access, store, and/or manage data. An example of the third-party server 160 may be an email server, a third party (or homegrown) electronic file management server, a public website for hosting and sharing specific file types (e.g. YouTube for videos, Behance for graphic files, LinkedIn Slideshare for presentations, and the like), or any other server used to access and/or store data files.

In some configurations, data accessible to the user computing devices 140 may be stored in a distributed manner onto more than one electronic repositories. For instance, one or more files may be stored onto a blockchain accessible to the user computing devices 140 where the blockchain comprises multiple distributed nodes storing data onto disparate electronic repositories. The analytics sever 110 may retrieve a public or private blockchain key associated with each user and/or each user computing device 140 to access the blockchain and monitor data stored onto the blockchain.

Even though different user computing devices 140 are depicted as having access to different electronic data repositories 150, it is expressly understood that in different embodiments and configurations, one or more user computing devices 140 may have access to a combination of different electronic repositories 150. For instance, user computing device 140*a* may utilize the third-party server 160 and the local database 150*a* to store data. In another example, user computing device 140*c* may utilize database 150*b*, cloud storage 150*c* and the third-party server 160 to access files/data. For the purpose of brevity, different combinations of different user computing devices 140 having access to different electronic data repositories 150 are not shown.

Figure 2:
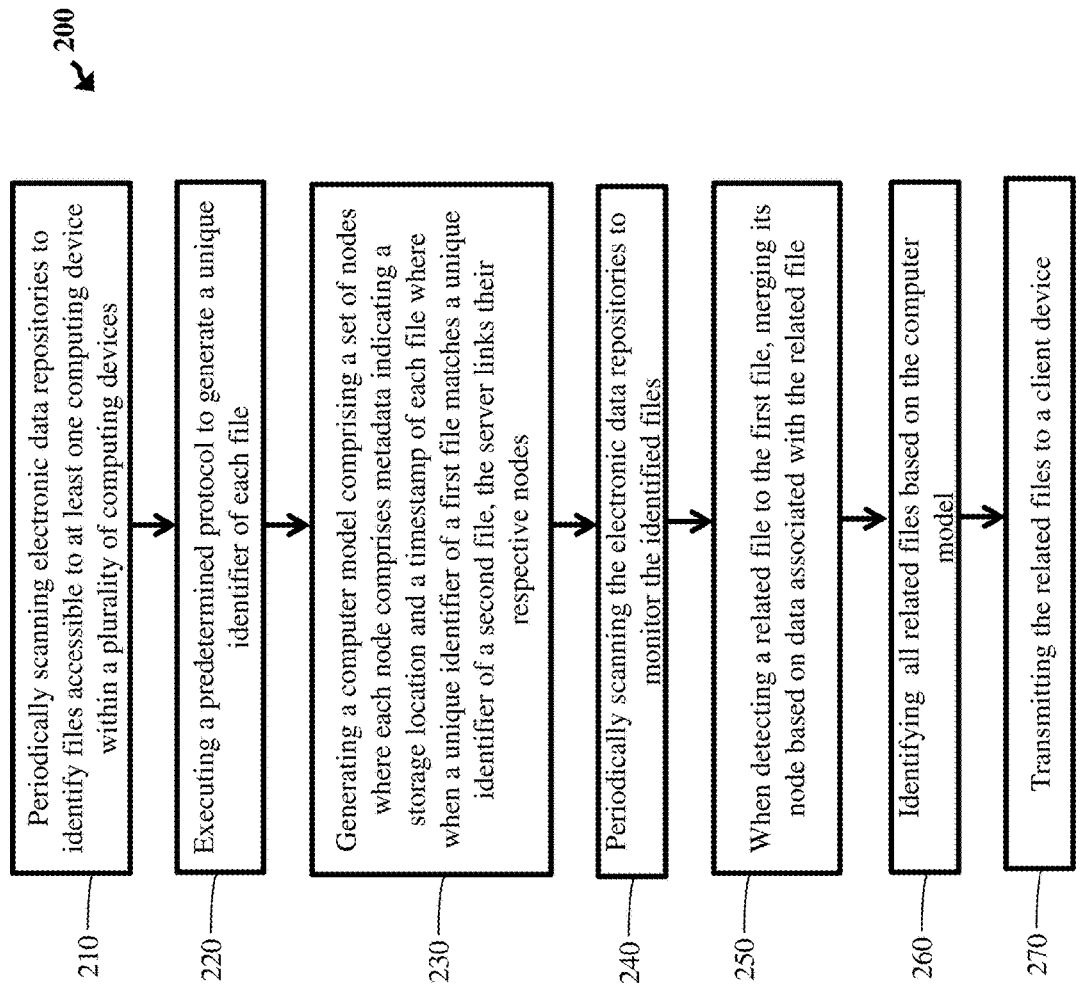
FIG. 2 is a flow diagram of a process executed in an electronic file management system, according to an embodiment.

FIG. 2 illustrates a flow diagram of a process executed in an electronic file management system, according to an embodiment. The method 200 includes steps 210-270. However, other embodiments may include additional or alternative execution steps, or may omit one or more steps altogether. In addition, the method 200 is described as being executed by a server, similar to the analytics server described in FIG. 1. However, in some embodiments, steps may be executed by any number of computing devices operating in the distributed computing system described in FIG. 1. For instance, part or all the steps described in FIG. 2, may be locally performed by one or more user computing devices or an administrator computing device. Furthermore, even though some aspects of the method 200 is described in the context of a web-based application, in other configurations, the analytics server may display related data in a mobile application or an application native to the user's desktop.

At step 210, the analytics server may periodically scan a plurality of electronic data repositories accessible to a plurality of computing devices to identify a plurality of files stored onto the plurality of electronic data repositories where each file is accessible to at least one computing device within the plurality of computing devices. As discussed above, the analytics server may periodically scan one or more electronic data repositories to identify electronic files stored onto such electronic repositories.

The analytics server may require all users to create accounts and grant permission to the analytics server to periodically monitor files accessible to each user and/or computing device operated by each user. In some configurations, the analytics server may provide a web-based application displaying various prompts allowing each user to grant the analytics server permission to periodically monitor all files accessible and/or revised by each user. The web-based application may provide at least five monitoring functionalities: 1) files saved on any electronic data repository accessible by each user; 2) each user's email communication; 3) each user's chat/messaging activity; 4) each user's task management or project management; and 5) each user's calendar events.

During the account registration process, the web-based application may display one or more prompts allowing each user to connect his or her email accounts, messaging tools, task management tools, project management tools, calendars, organizational or knowledge management tools (e.g. Evernote®, Atlassian Confluence®, etc.), other collaborative tools (e.g. Basecamp®, Smartsheet®, etc.) and/or electronic repository systems (e.g. local database, cloud storage systems, and the like) to the analytics server. The prompt may also include one or more text input fields where each user can input identification and authentication credentials for his email accounts, messaging tools, electronic repository systems, and/or third party applications, such as project management tool, time tracking applications, billing, issue tracking, web accounts (e.g., YouTube®), online applications (e.g., Figma®, Onshape®, Google Docs®, and the like). For example, a user may enter his email address and password in the input fields displayed by the analytics server. Upon receipt, the analytics server may use the authentication credentials to remotely login the above-described portals and monitor all files accessible and/or revised by each user and/or all files saved on the electronic data repositories.

Upon receiving permission and/or authorization from users, the analytics server may scan the one or more electronic data repositories accessible to each user. The analytics server may execute a scanning or crawling protocol where the analytics server crawls different databases to identify all files accessible to each user.

As discussed above, an electronic repository may represent any electronic repository storing files that are accessible to one or more computers within an entity or a network. Non-limiting examples of an electronic repository may include a database, cloud storage system, third-party shared drives, third-party application as described above, internal file transfer protocol (FTP), and internal or external database operated by the analytics server, email storage, HR systems, accounting systems, customer relationship management (CRM) systems, and the like.

The analytics server may, upon receiving permission from one or more computing devices, periodically scan the above-described electronic repositories and identify one or more files stored onto these electronic repositories. For instance, an administrator of an entity may grant permission to the analytics server to scan all repositories accessible to all computers within the entity.

Upon identification of each file, the analytics server may search data associated with the identified files and may re-create an activity timeline for each user. The activity timeline may present historical data associated with each file and each user. For instance, when the analytics server identifies a file (e.g., Sample.doc), the analytics server may further identify a history of Sample.doc by analyzing said file's history (e.g., revision, communication, and access history of the file). As a result, the analytics server may create a timeline that indicates every interaction (e.g., file generation, revisions, modification, and the like) with Sample.doc.

In some configurations, the analytics server may retrieve the file history and other related data (e.g., context data) using an application programming (API) interface in communication with the electronic data repositories. For instance, the analytics server may be prohibited from accessing a third-party shared drive. In those embodiments, the analytics server may use an API configured to communicate with the third party shared drive to identify and monitor files. The analytics server may further use a similar protocol to determine whether a file has been revised/modified. For instance, the analytics server may cause an API to connect/sync with a third-party document sharing application. The analytics server may also cause the API to transmit a notification for each instance that a file, stored on the third-party document sharing application, is accessed and/or revised by a user.

In some configurations, third-party service providers of shared document drives may not allow the API to transfer detailed data regarding file revisions. For instance, third-party service providers may only transmit a notification that a file has been accessed and/or revised by a user. However, the API notification may not contain the revision (e.g., change of text, formatting, and the like) to the file. In those embodiments, the analytics server may remotely access the shared drive, using credentials obtained from the user during the account registration process, obtain a copy of the file, and compare the file to a previous version.

The analytics server may also include the API notification in the metadata profile of each identified file. For instance, the analytics server may receive an API notification that a first user has shared File X with a second user on a third-party document sharing application. The API notification may not include any specific data regarding the content of File X because the analytics server may be prohibited from retrieving a copy of File X. The analytics server may include the document sharing activity in the metadata of File X (within the nodal data structure described below), which may include a timestamp of the document share and data associated with the first user and the second user. As a result, the analytics server may reconstruct an activity timeline for File X that includes information on how File X was shared (e.g., medium and timestamp) and different users who interacted with File X.

In another example, user 1 may share File X with user 2 using a third-party file management application. Using an API connect to the third-party file management application, the analytics server may receive a notification that File X was shared between two users at a certain time. The API notification may not include user identifiers and may not identify the sender or the receiver of File X. The third-party file management application may also notify user 1 and/or user 2 regarding the file sharing. For instance, the third-party file management application may send an email to user 2 informing user 2 that user 1 has shared File X with user 2. The email may also include an identifier associated with File x (e.g., URL of File X). Because the analytics server has access to emails of user 1 and user 2, the analytics server can identify that user 1 has shared File X with user 2. The analytics server may then include the file path, timestamp of the email, and timestamp of the file share, in the File X's metadata file. In some configurations, the analytics server may create a node for the email and/or the file path (e.g., URL) included in the email.

At step 220, the analytics server may execute a predetermined protocol to generate a unique identifier of each file within the plurality of files. Upon identifying each file, the analytics server may execute a predetermined hashing algorithm and generate a unique identifier for each file identified in step 210. A hashing algorithm or protocol may be a function that converts a data string into a numeric string output of fixed lengths. The output string is generally much smaller than the original data. Hash algorithms are designed to be collision-resistant. In other words, there is a very low probability that the same string would be created for files with dissimilar content. Simply put, the analytics server may create a unique identifier for each file identified in step 210. As described below, the analytics server may use the unique identifier (e.g., generated hash string) to compare files with each other and/or with their previous versions.

Using the hashing algorithm, the analytics server may eliminate the need to retrieve files and to execute file-comparison protocols, which requires extensive computing power and increases the chance of unintended file corruption. For instance, the analytics server may store the unique identifier for each file in a database. Upon detecting a revision of a file, the analytics server may execute the same hashing protocol using the purportedly revised file and compare the newly generated unique identifier with the previously stored unique identifier. In this way, the analytics server identifies whether the file has been revised using less processing power than conventional systems.

In some configurations, the analytics server may use message-digest protocol 5 (MD5) hashing protocol to generate the unique identifier for each identified file. Using the MD5 hashing protocol, the analytics server may generate a unique identifier for each file that contains a 128-bit hash value representing the content of each identified file. Because the unique identifier comprises an output string, which is smaller than the original file, executing data-comparing protocols on the unique identifier (rather than performing the same protocols on the original file) requires much less processing power.

Each element related to a file may include a unique identifier. For instance, where a file is stored (storage drive or a storage folder) may have its unique identifier. When a file is sent via an email message, the email may have its own unique identifier. In some configurations, the analytics server may use these identifiers to compare files and determine whether they are related. For example, a PDF stored on Google Drive file may have 3 unique identifiers: (1) a unique URL, (2) a unique ID generated by Google Drive, and (3) a unique content-based hash ID generated by the analytics server. The analytics server may use all the unique identifiers to compare files.

In a non-limiting example, file 1 may be associated with a unique identifier of a related task, a unique identifier of a related email, and a unique identifier of a storage drive. File 2 may be associated with a unique identifier of a related email and a unique identifier of a related task. In some configurations, the analytics server may compare the unique identifiers of files 1 and 2 (e.g., unique identifier of the email related to file 1 compared to unique identifier related to file 2). When a number of similar unique identifiers satisfy a threshold, the analytics server may determine that the files are related.

As a result, when two web-based files (e.g., two files saved on a third-party file sharing application) share the same drive identifier (e.g., are saved within the same storage drive or folder), the files may be associated with similar unique identifiers associated with the folder or the storage drive. Consequently, the analytics server may determine that they are related.

In some configurations, the analytics server may generate the unique identifier for each file based on a combination of one or more of the above-described methods. For example, the analytics server may generate the unique identifier for each file using the hashing protocol, and an identifier of where the file is saved. As described herein, a "unique" identifier is unique to each file. Furthermore, other elements described herein can have unique identifiers. For instance, a storage drive on which a file is stored may have a unique identifier. In another example, an email sent to a user may have its own unique identifier. For instance, the analytics server generates unique identifiers such that a unique identifier cannot be generated for two unrelated files.

When the analytics server determines that the file is a file path, shortcut, link/URL, bookmark, or an identifier of an online file (e.g., Google Docs®, OnShape®, and the like), the analytics server ay generate the unique identifier based on the file's URL. For instance, a unique identifier may be embedded within the URL of a file.

At step 230, the analytics server may generate a computer model comprising a set of nodes where each node comprises metadata indicating context data of each file within the plurality of files, wherein when a first unique identifier of a first file matches a second unique identifier of a second file, the server links a first node corresponding to the first file to a second node corresponding to the second file. The analytics server may create a computer model comprising a nodal data structure (or data graph) where each node represents an identified file. The analytics server may store the nodal data structure in the system database (or any other electronic data repository, such as a cloud bases storage, local/internal data storage, distributed storage, blockchain, and the like) described in FIG. 1.

The nodal data structure may be a complete map of all the files identified in step 210. Each node may also contain metadata further comprising historical (e.g., context) data associated with the file, such as the generated unique identifier of the file, title, mime type, file permissions, comments, and the like. The metadata may also indicate a revision history associated with each file. For instance, the metadata may include timestamp of every revision for each file, a unique identifier (e.g., user ID, IP address, MAC address and the like) of the user and/or the computing device who accessed and/or revised the file, and the like. Other context data may include, but not limited to, email identifiers (e.g., unique email identifiers, sender identifier, receiver identifier, and the like), tasks associated with the files, user identifiers, mime type, collaboration information, viewing permission, title of each file, and the like.

The metadata may also include context information associated with each file. For instance, the metadata may include email/chat communication that are related to each file. In another example, if the analytics server determines that a file has been transmitted via an email or other electronic communication protocols (e.g., referenced or attached in an email message, referenced in a chat session, and the like), the analytics server may include a transcript of the electronic communication (e.g., body of the email) in the node, as metadata. The analytics server may index each node based on its associated metadata and make each node searchable based on its metadata.

The analytics server may compare the unique identifiers for of all the files identified in step 210. When the unique identifiers of two or more files match, the analytics server may link the nodes representing the two or more files in the above-described nodal data structure. A link (or edge) may connect similar or associated nodes within a nodal data structure such that the analytics server may retrieve context metadata more efficiently. Edges can be directed, meaning they point from one node to the next, or undirected, in which case they are bidirectional. The analytics server may use different directed or undirected edges to link different nodes. Edges between nodes can be given special classifications, including but not limited to "copy", "version", "parent", "child", "derivative", "shared email", "shared task", "shared tag", and "shared folder. The analytics server may also combine relevant metadata from related files and display to the client (e.g. files A and B are copies of each other, and file B is attached in an email message. When user previews file A, the email message for file B can be displayed). As described below, the analytics server may use the links to identify a latest version of a related family of files.

Figure 3:
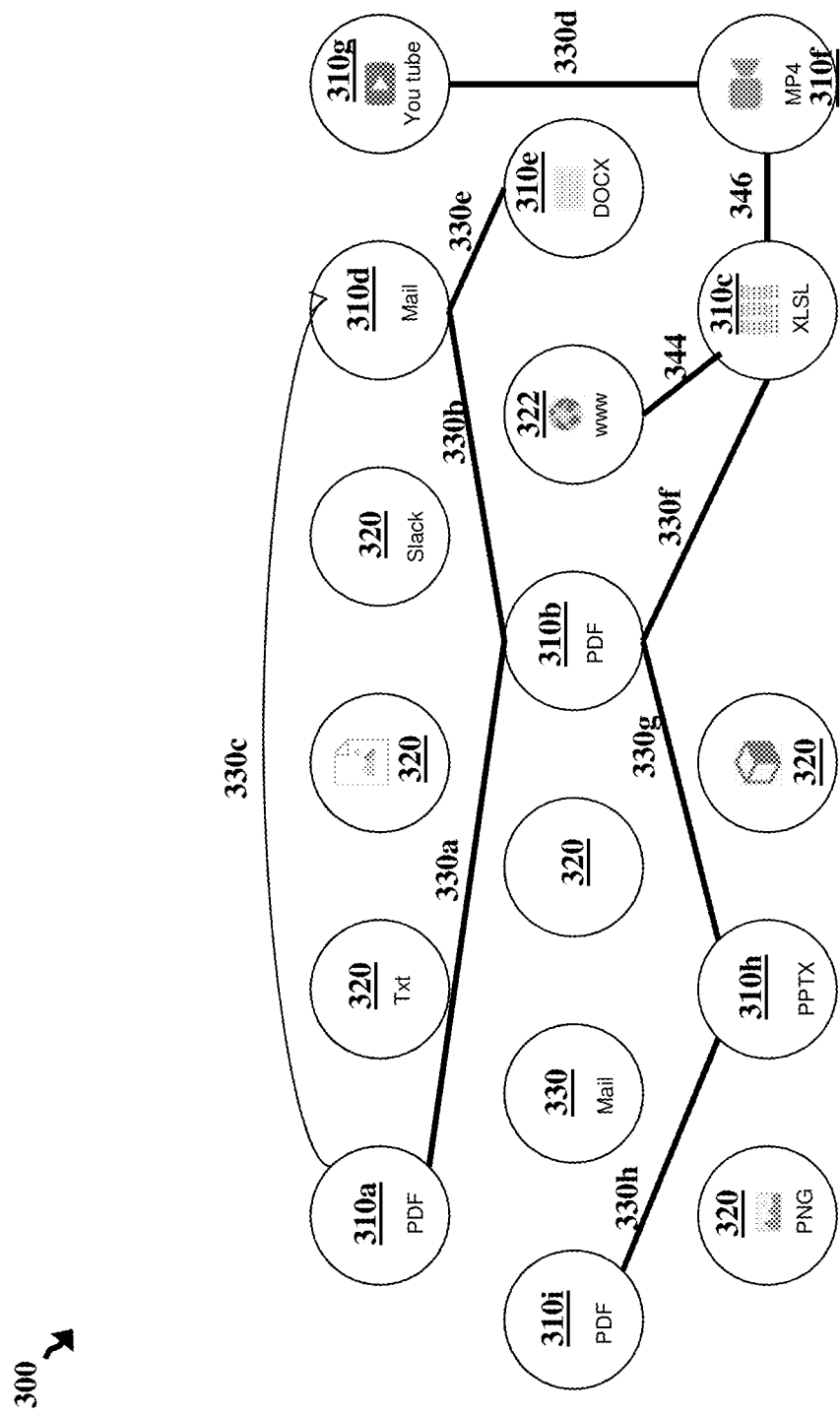
FIG. 3 is a nodal data structure representing multiple identified files within a computing environment, in accordance with an embodiment.

Referring now to FIG. 3, nodal data structure 300 represent a nodal structure created based a set of identified files and related nodes connected via different edges. As depicted in FIG. 3, the analytics server identifies 17 files and creates a node for each file (nodes 310*a-i* and nodes 320). For instance, node 310*b* represent a pdf file stored locally on a computer of an entity (e.g., computer within a network of computers); node 310*h* may be a PowerPoint Open XML file stored on a cloud storage accessible to another computer within the same network. As described above, each node may include an indication of a location where the file is stored. For instance, node 310*e* may represent a DOCX file stored in a local database. Therefore, node 310*e* may include metadata comprising a path of the DOCX file to the local database. Additionally, as described above, multiple nodes may be linked together. For instance, links 330*a-h* connect nodes 310*a-i* that represent related files. Furthermore, because the analytics server identifies that nodes 320 are not related, the analytics server does not link nodes 320, as depicted in FIG. 3. As described above, a "file" may also refer to a path associated with data. For instance, a file may refer to the underlying data regardless of where the data is stored and/or hosted or the application needed to view the data. For instance, a file may include a link (directing a user to view the underlying file). The file may only exist as on online file and may only be accessible through an Internet browser or mobile application, and in some cases, it may not be able to be downloaded to a local machine without some type of conversion (e.g., Google Docs® or Google Slides® only exist online, but can be downloaded as MSFT .docx or .pptx).

A path may specify a unique location of a file within a file system or an electronic data repository. In some configurations, a path may point to a file system location by following the directory tree hierarchy expressed in a string of characters in which each component of the string, separated by a delimiting character, represents a directory. In some configurations, the analytics server may use a uniform resource locator (URL) to identify each file's stored location. For instance, when a file is stored onto a cloud storage or when a file is stored onto a third-party shared drive, the analytics server may include a URL of the file in the nodal data structure.

In some configurations, and as described above, the nodal structure may not include the identified files and may only comprise nodes representing file locations (and other metadata) and edges representing how different files are related. For instance, instead of storing multiple files (and possibly multiple version of the same file and/or related files) the analytics server may only store the nodal data structure in a local or external database. In this way, the analytics server may conserve significant storage space because storing a representation of a file requires significantly less storage capacity than storing the file itself. Furthermore, as described below, identifying relationships (and executing various protocols to identify context, relationship or other related data for each file) is much less computationally intensive when performed on the above-described nodal data structure than executing the same protocols on the files themselves. In this way, the analytics server may conserve significant computing and processing power needed to provide file management services. As a result, the analytics may deliver results in a faster and more efficient manner than provided by conventional and existing file management methods.

Figure 4:
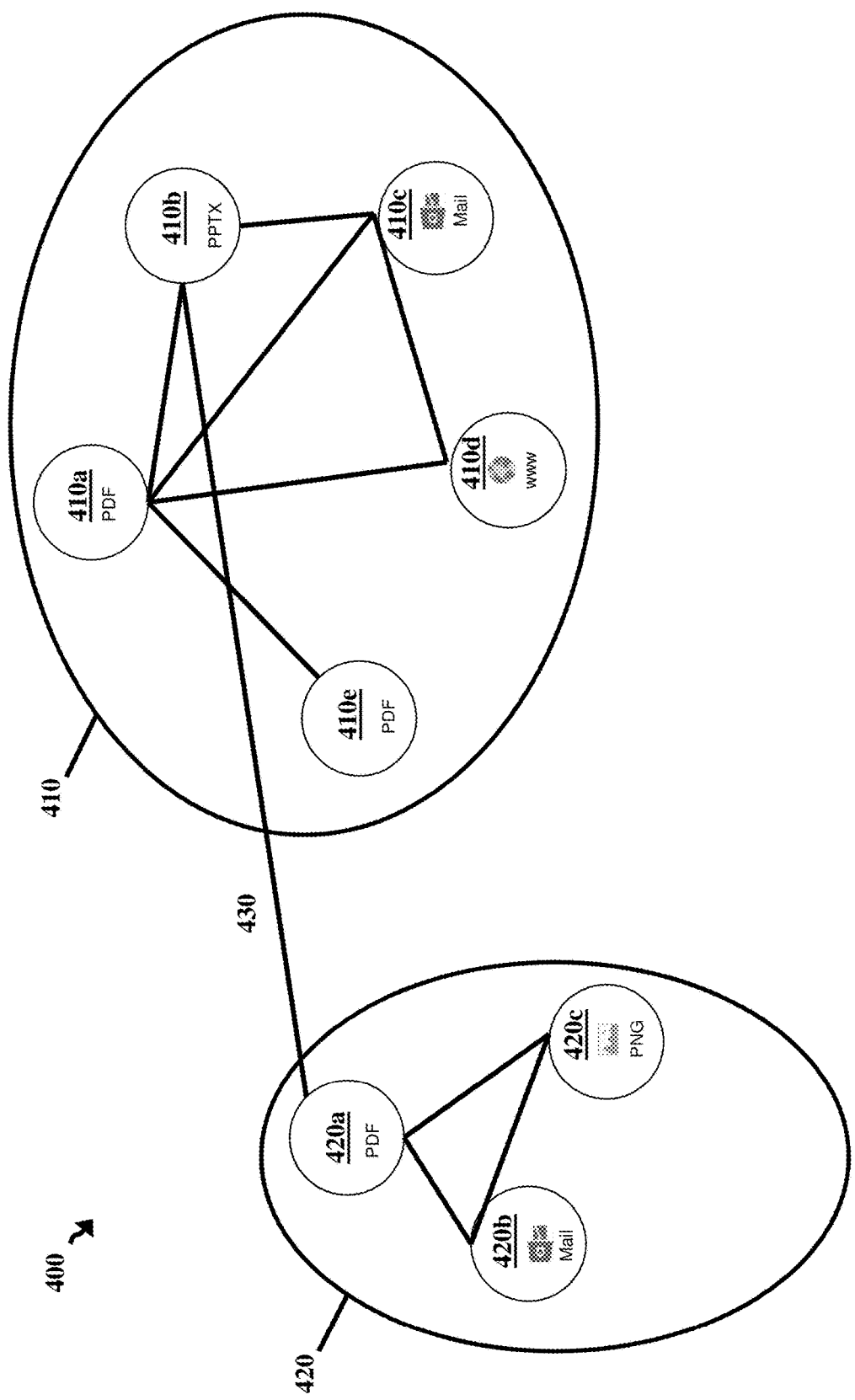
FIG. 4 is a nodal data structure representing multiple identified files within a computing environment, in accordance with an embodiment.

Referring now to FIG. 4, another illustration of a nodal data structure is illustrated. Nodal data structure 400 represents a clustered nodal data structure where the analytics server clusters related files into data clusters 410 and 420. As described above, each node within the data structure 400 represents an identified file. Each node within the nodal data structure 400 may include metadata associated with each respective file (e.g., indicating the location, type, historical data, context data associated with the file, and the like). Upon identifying relationships between files, the analytics server may generate a cluster that represents all related nodes/files. For instance, the analytics server may determine that a unique identifier of a first pdf file on a first computer (represented by node 410*a*) matches the unique identifier of a second pdf file stored on a cloud storage accessible by a second computer (represented by node 410*e*). In response to identifying this relationship, the analytics server may link nodes 410*a* and 410*e*. Subsequently, the analytics server identifies that a PowerPoint file (represented by 410*b*) and a web link (represented by node 410*d*) were transmitted via an email message (represented by node 410*c*) that also includes the pdf file represented by node 410*a*. In response, the analytics server may link node 410*a* to each of nodes 410*b*, 410*c*, and 410*d*. The analytics server may further link node 410*b* and node 410*d* to node 410*c* because files represented by nodes 410*b* and 410*d* may be related. As seen in FIG. 4, the analytics server creates data cluster 410 that includes all the above-mentioned nodes.

The analytics server may execute similar protocols as described above to identify interrelated files and generate multiple clusters. For example, the analytics server may cluster nodes 420*a-c* into cluster 420. Furthermore, one or more nodes within different clusters may also be linked, as represented by edge 430. As described above, data cluster 410 and 420 each represent a related family of files. Different clusters may be stored into different shards to optimize storage and efficiency when identifying nodes (e.g., step 260).

In some configurations, the analytics server may consolidate all metadata associated with each identified file to identify all related users and content. In a non-limiting example, the analytics server may identify that user 1 sent File A in an email (along with File B) to user 2; user 2 downloaded File A and stored File A in a folder with File C. As a result, the analytics server may connects nodes representing files A, B, and C. When a user accesses any of the files A, B, or C, the analytics server notifies the user regarding the relationship between these files. As described herein, the analytics server may only customize the notifications in accordance with each user's access permissions. For instance, if a user is not authorized to access (or view) File B, the analytics server may only display notifications regarding Files A and C to the user.

Referring back to FIG. 2, at step 240, the analytics server may periodically scan the plurality of electronic data repositories, to monitor the first file and the second file. The analytics server may periodically scan the electronic repository as discussed above. In some configurations, the frequency of data scanning may be predetermined or may be adjusted by an administrator in accordance with an entity's needs. For instance, an administrator may require the analytics server to scan the electronic data repositories every week, day, or multiple times per day depending on their unique needs and data sensitivity.

In some configurations, the analytics server may only scan the electronic data repositories in response to receiving a notification or a trigger from another server, such as an email message, a third-party API or a data management server operationally in communication with a data repository. For instance, as described above, the analytics server may utilize various APIs to monitor the identified files. Therefore, the analytics server may receive a notification, from an API, that a file has been revised. In some embodiments, the API may transmit details of the revisions (e.g., user name, timestamp, and the like). In some other embodiments, the API may not be configured or authorized to transmit such detailed data. In those embodiments, in response to receiving the notification from the API indicating that a file has been revised, the analytics server may further scan the electronic repository (or other repositories, such as email, third-party applications, and other repositories) on which the file is stored. As a result, the analytics server may retrieve revision details associated with the revised file.

At step 250, the analytics server may, for each instance of the server detecting a related file to the first file, merge the first node where the merged first node corresponds to a context data of related files (e.g., storage location and a timestamp of the related file to the first file and context data of the first file). In response to identifying a revision or a modification to a file, the analytics server may revise the nodal data structure accordingly. For instance, as described above, the analytics server may identify that a file has been revised or modified by a user within the network. The analytics server may then update the metadata associated with the node and the respective edge representing the revised file with revision/modification data. For instance, the analytics server may update the node metadata with a user identifier, timestamp, content of the revision, and other historical data. When the analytics server identifies a revision of the file, the revised file is no longer a "copy" of the original file. Therefore, the analytics server updates the metadata of the revised file from "copy" of the original file to a "version" of the original file.

In some configurations, the analytics server identifies related files based on their context data stored onto one or more nodes representing each respective file. For instance, in some embodiments, the analytics server may update or revise the nodal data structure by generating new nodes and/or edges. For instance, when the analytics server discovers that a user has attached a file in an email communication, the analytics server may generate a node that represents the email communication. The analytics server may then update the node's metadata with information associated with the email communication (e.g., timestamp, email body, email address, sender user identification, receiver's user identification, and other context data described herein).

In some configurations, if the email communication includes other files or web links, the analytics server may create individual nodes for other related files. For instance, and referring to FIG. 3, node 310*d* represents email communication between two users where one user attached a pdf file represented by node 310*b*. Furthermore, in the email represented by node 310*d*, the user also attached a document represented by node 310*e*. As depicted in nodal data structure 300, the analytics server may also link the above-described nodes using edges 330*b* and 330*e*. As a result, the analytics server may continuously and iteratively update the nodal data structure. Therefore, the nodal data structure is a dynamic computer model, which adapts to user interactions.

In some configurations, the analytics server may combine metadata from multiple related nodes into a single metadata file. Instead of each node having a separate metadata file, the analytic server may create a single metadata file associated with a file where the metadata file contains all metadata associated with all (or a given subset of) related nodes. For instance, if File A is related to Files B-F, the analytics server may create a single metadata file and combine metadata associated with Files A-F. Upon identifying additional related files (or other related data, such as tasks, messages, and the like), the analytics server may update the metadata file accordingly.

In some configurations, the analytics server may augment the metadata file using public data. For instance, in addition to scanning the electronic repositories described herein, the analytics server may also scan publicly accessible repositories (e.g., public websites or other publicly-accessible data). When the analytics server identifies a public file related to an identified file, the analytics server may augment the identified file's metadata file. For instance, the analytics server may identify a video file stored locally onto a user's computer. The analytics data may then determine that the identified video is similar to a video publicly shared on a website (e.g., YouTube®). Consequently, the analytics server may augment the identified video's metadata file using data associated with the publicly share video (e.g., URL of the video).

As described above, the analytics server may use two methods to merge two nodes where the two nodes represent two related files (e.g., copies of the same file, and/or files that have been determined to be related). First, the analytics server may create a new node for the newly discovered related file and may link the nodes together. Second, the analytics server may combine the metadata of the newly discovered file with the original file (e.g., create a single metadata file and combine all metadata corresponding to context information of the related file to the original file). The analytics server may also use one or both of the above-described methods when merging two nodes.

In a non-limiting example, the analytics server may identify two copies of the same file where the first file is stored on a local database and the analytics server identifies the second file as an attachment in an email sent from a first user (or when the file path is transmitted through the email) to a second user. The analytics server may then combine the metadata associated with the email (e.g., email message, sender identifier, receiver identifier, content data, mailbox identifier, and the like) with the metadata associated with the first file (e.g., name of the local system, size, data modified, folder, and the like). For instance, the analytics server may generate a single metadata file that contains metadata associated with the first file and the second file. The analytics server may then use the combined metadata file to identify related files, build, and suggest relationships between the first/second file and other files identified. In another example, the analytics server may generate a node that represents a file. When the file is attached in a task, the analytics server may generate a new node for the task. Therefore, the analytics server may operate in two ways: 1) creating a new node for a related file; and/or combining the context into a single metadata file for a file. In some configurations, the analytics server may use a combination of the above-described methods.

At step 260, the analytics server, in response to receiving from an electronic client device, a request to access the first file or the second file, may identify all or some of the related files to the first file or the second file in accordance with a latest timestamp of the first node or the second node. The analytics server may receive a request to access a file. For instance, a user may click or otherwise interact with a file and transmit a request to access the file (e.g., view, edit the content, revise the name, send, or otherwise interact with the file). In some embodiments, the user may access a shared third-party application and transmit a request to access the file. In response to determining that the user has requested to access a file, the analytics server may identify a node within the nodal data structure that represents the requested file.

Upon retrieving the identified node, the analytics server may retrieve all related nodes and metadata associated with the identified nodes and/or the related notes within the nodal data structure. The analytics server may analyze the metadata retrieved and identify all related files (including a latest version of the requested file). For instance, the analytics server may retrieve all timestamps for all nodes related to a node representing the requested file. The analytics server may then compare all timestamps to identify a latest version of the requested file. The analytics server may also identify relationships between files by determining relationships between different nodes representing those files. These relationships (identified related nodes) may be displayed on the GUI viewed by the user. For instance, when a user accesses a file, the analytics server may identify the original file, different copies, versions, derivative, shared tasks, shared comments, shared emails, shared tags, and shared folders that are associated with the file. The analytics server may also display these related items on the GUI, as depicted in FIG. 5, FIGS. 6A-C, and FIGS. 7A-B.

At step 270, the analytics server may retrieve all files related to the requested file—in accordance with the storage location of the latest version of the requested file identified based on the updated first node—and may transmit the retrieved latest version to the electronic client device. As described above, the analytics server may identify a node that represents a latest version of the requested file. Subsequently, the analytics server may use the path stored within the metadata of the identified node to retrieve a latest version of the requested file and transmit the retrieved latest version to the electronic client device. The analytics server may populate a graphical user interface that displays various information associated with the requested file. As described below, the analytics server may directly display graphical user interface on the user's computer or may incorporate the graphical user interface into a third-party application, such as a third-party email application. In some embodiments, the analytics server may display all versions of the requested file. For instance, in addition to displaying the latest version, the analytics server may display an option for the user to access an older version or a related version (e.g., a version of the requested file that was shared in an email). Using the above-described options, the user may access and interact with an older version of the request file.

Using the methods and systems described herein, the analytics server also allows users to interact with files stored onto disparate electronic data repositories using the same web-based application (e.g., browser). For instance, the analytics server may identify a node representing the requested file stored onto a first electronic data repository, a first related node representing an email stored onto a second electronic data repository that included the requested file as an attachment, and a related file stored onto a third electronic data repository. The user may access all the above-mentioned files (requested file, related file, and related email) from the same browser even though the above-mentioned files are stored onto different electronic repositories.

To retrieve all related data (e.g., all related files including the latest version of a file), the analytics server may utilize the Apache Lucene project's open source enterprise search platform, Solr®, for full-text indexing and searching. As described above, the analytics server may index every node within the nodal data structure, which allows the nodes to be searchable by their associated metadata. Furthermore, executing the above-described indexing and searching protocol on the nodal data structure, as opposed to all files stored in a central data repository, allows the analytics server to identify nodes and retrieve related metadata in real-time or near real-time.

Referring now to FIG. 5, an example of a graphical user interface displaying file context information is illustrated. In some configurations, the analytics server may display GUI 500 directly on a user's computer. For instance, when a user interacts with a file (e.g., clicks on a file and request the file to be opened), the analytics server may display the GUI 500 on the user's computer. In the depicted embodiment, a user requests File XYZ to be opened. As a result, the analytics server displays the GUI 500. In some other embodiments, the analytics server displays an indicator associated with File XYZ and displays the GUI 500 in response to the user interacting with the indicator.

The GUI 500 may display filename and file types of the requested file in the graphical component 510. For instance, graphical component 510 indicates File XYZ (file name) and further indicates that File XYZ is a PDF file (file type). The GUI 500 may also comprise an interactive graphical component 520. When the user interacts with the interactive graphical component 520 (e.g., by clicking), the analytics server may display content of File XYZ. Another interactive graphical component 560 may allow the user to share File XYZ with other users. For instance, when the user interacts with the interactive graphical component 560, the analytics server may generate an interactive link configured to direct the recipient to the File XYZ (e.g., a URL or other paths indicating a storage location of the File XYZ).

Figure 7A:
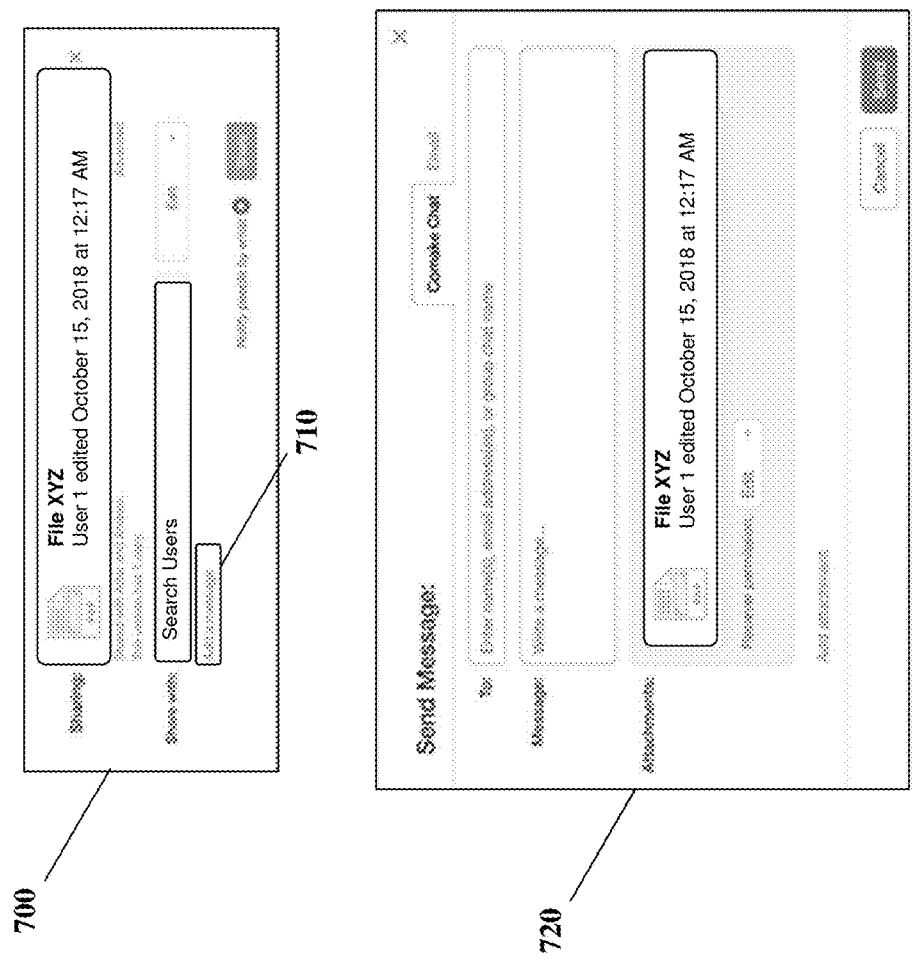
FIGS. 7A and 7B illustrate a messaging application, in accordance with an embodiment.
Figure 7B:
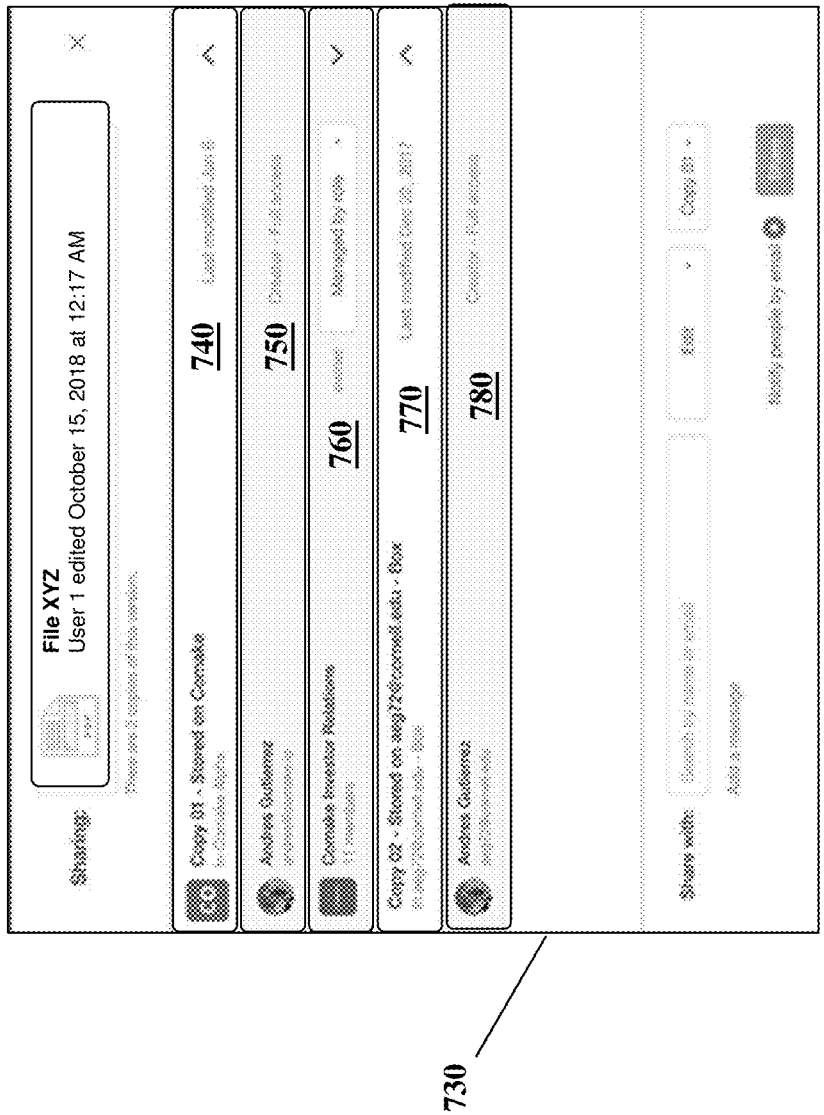

In some configurations, the analytics server uses a messaging application to transmit the requested file to other users. When a user interacts with the graphical component 560, the analytics server may direct the user to the messaging application (or otherwise referred to as the sharing panel). Referring now to FIG. 7A and FIG. 7B, an internal messaging application is illustrated, in accordance with an embodiment. The internal messaging application may include a graphical component 700, where the user can search for other users/employees/contacts, identify one or more recipients, and share the file with the identified recipients. When the user interacts with the graphical component 710 ("add message), the analytics server may display a graphical component 720 where the user can add customized messages and other attachments.

The internal messaging application may also provide the user with the option to transmit the file via any third-party email or messaging system previously connected to the analytics server. As a result, the user may draft an email using the internal messaging application provided by the analytics server (e.g., while interacting with the file) and the analytics server may transmit the email by communicating with the third-party email application. The above-described method creates a significant positive user experience because the user is no longer required to interact with multiple interfaces and applications.

In some configurations, the analytics server may also display interrelated relationships associated with the requested file. For instance, when the user interacts with the "advanced" hyperlink displayed in the graphical component 700, the analytics server may display the graphical component 730 where the analytics server displays files and activities related to the requested file. For instance, graphical component 740 displays information regarding the first copy of File XYZ (e.g., data regarding storage area and the date of the last modification), graphical user component 750 displays data regarding the "creator" of the first copy of File XYZ, graphical component 760 displays data regarding a group of users who are permitted to access File XYZ, graphical component 770 displays data associated with a second copy of File XYZ (including graphical component 780 displaying the creator).

Using the graphical component 730, the user can also manage all of the permissions for all of the different versions and files related to File XYZ simultaneously. For instance, the user can revise a list of users who can access File XYZ by interacting with the drop down menu displayed in the graphical component 760.

As described above, the analytics server may customize each GUI and graphical component described herein in accordance with the user's role. For instance, while the analytics server may identify that the File XYZ has 10 related copies/versions, the user may only view the copies/versions and relevant metadata to the two copies/versions for which the user is authorized to view.

The GUI 500 may also comprise interactive component 530 comprising a status indicators illustrating a status of File XYZ. For instance, the interactive status indicators may indicate whether File XYZ is muted or "watchlisted." A file can be muted, followed, or watchlisted. If a user has never interacted with a file, the user may never get any updates or notifications regarding that file. If a user has interacted with a file (e.g., modify a file, send a file, received a file, create a file, change permissions of a file), the user may get key updates regarding that activity around that file. In some embodiments, the updates/notifications may be transmitted to each user via a feed, such as an RSS feed delivered to each user, or via daily email overviews of all relevant updates. Users can also choose to manually follow or watchlist a file. When a user watchlists a file, the user may receive notifications regarding all activity related to that file, including all of its copies and versions.

Through advanced settings, the user may determine to "hide" or "ignore" a file, meaning that the analytics server may not compare the file to other files stored within other electronic data repositories. Additionally or alternatively, the analytics server may not monitor a hidden or ignored file. However, when a file is watchlisted, the analytics server periodically monitors the file, as described above. The GUI 500 provides the user with the option to change the status of File XYZ by interacting with the interactive indicators.

The GUI 500 may also comprise a graphical component 540, which displays context information associated with File XYZ. Data displayed in the graphical component 540 may be retrieved from metadata stored within the nodal data structure and may include type, size, timestamp of creation, owner, an indicator of storage location, and different tags associated with file XYZ. Graphical component 540 may provide the user with the option to delete, add, and/or revise different tags. In some implementations, users can add custom metadata fields. In some configurations, the analytics server may further identify suggested tags for file XYZ based on related files and their respective tags. The analytics server may also suggest tags based on file content, file relationship, a user identifier, tags gleaned through user activity, and more.

The GUI 500 may further comprise a graphical component 550, which displays all the versions and copies (including the latest version) of the requested file permitted to be viewed by the user. For instance, the graphical component 550*a* displays that user 1 uploaded File XYZ one on Jun. 26, 2018. The graphical component 550*b* displays that the analytics server has identified a related file (e.g., a file with a matching unique identifier, as described above). As depicted in graphical component 550*b*, the related file name is File XYX, which is also a PDF file. The graphical component 550*b* displays that File XYX was identified in an email communication between user 1 and user 2 on Apr. 12, 2018. Furthermore, graphical components 550*c-e* indicate where File XYZ and File XYX are stored respectively. Even though the embodiment described here uses a related file that is the same file type as the requested file, in some configurations, a related file may not be the same file type. For instance, a PDF file stored in a first electronic repository may be stored in a second electronic repository as a document file.

In some configurations, each graphical component shown may be interactive. For instance, the user may click on any of the above-described graphical components and the analytics server may direct the user to the file represented by each respective graphical component. For example, if the user clicks on the graphical component 550c, the analytics server may retrieve a location of the email communication between user 2 and user 1 and may change component 540 to display details regarding the graphical component 550C. The analytics server may also open the message tab of GUI 500 and display the email communication on the GUI 500, as shown in FIG. 6B.

The graphical component 550 may also display a suggested related file (e.g., a version). As described above, the analytics server may periodically monitor all files accessible by all computers within a network (e.g., all computers within an entity or all registered users) to identify related files/content. When the analytics server identifies the related file/content, the analytics server may display the identified related file/content in the GUI 500. For instance, graphical component 500f indicates that the analytics server has identified File XYP, which is also a PDF file and is identified as related to the file XYZ by the analytics server. The graphical component 500f also indicates that file XYP was received in an email correspondence from user 3 user on Oct. 1, 2018. This is possible because the analytics server determines that file XYP may, for example, share an email thread with file XYZ and due to other similar metadata, it establishes that they are likely versions of each other. Alternatively, user 3 could have been working on file XYZ before (e.g., satisfying a predetermined time threshold) saving file XYP and therefore, by closeness of activity along with other considerations, the analytics server suggests file XYZ and XYP as versions of each other.

Figure 6A:
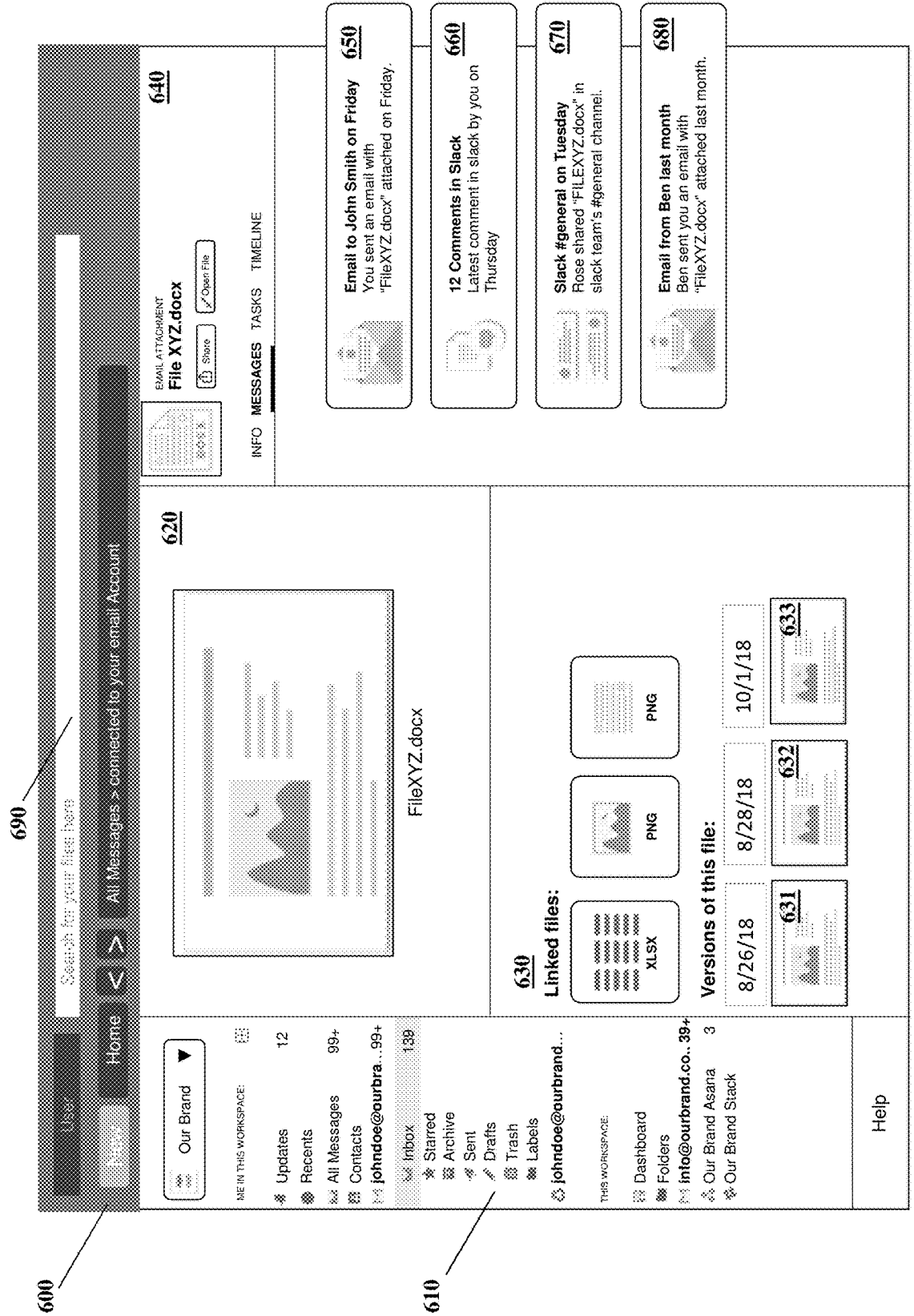
FIG. 6A is a graphical user interface displaying a file and its context information, in accordance with an embodiment.
Figure 6B:
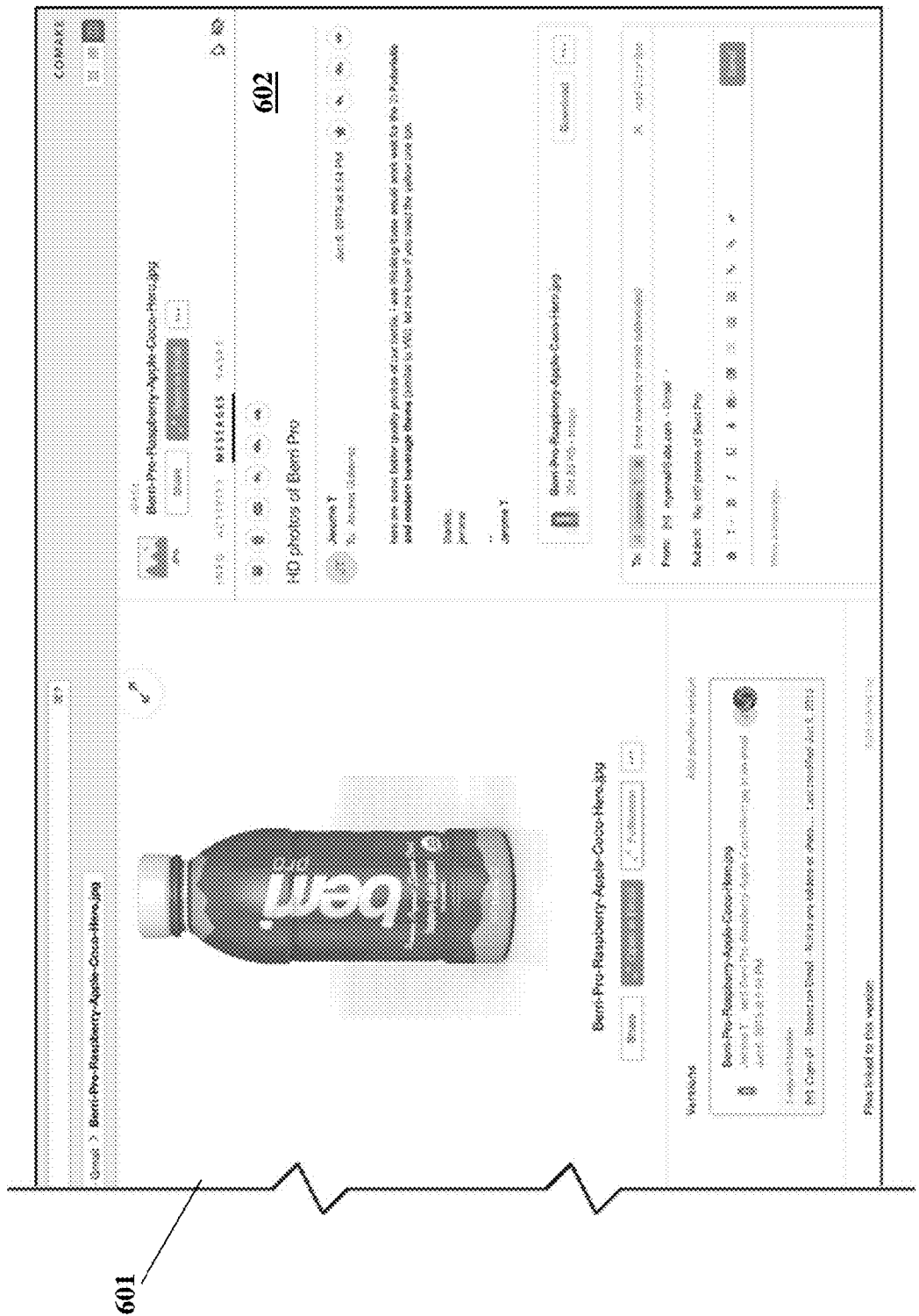
FIG. 6B is a graphical user interface displaying a file and its context information, including a related email message, in accordance with an embodiment.
Figure 6C:
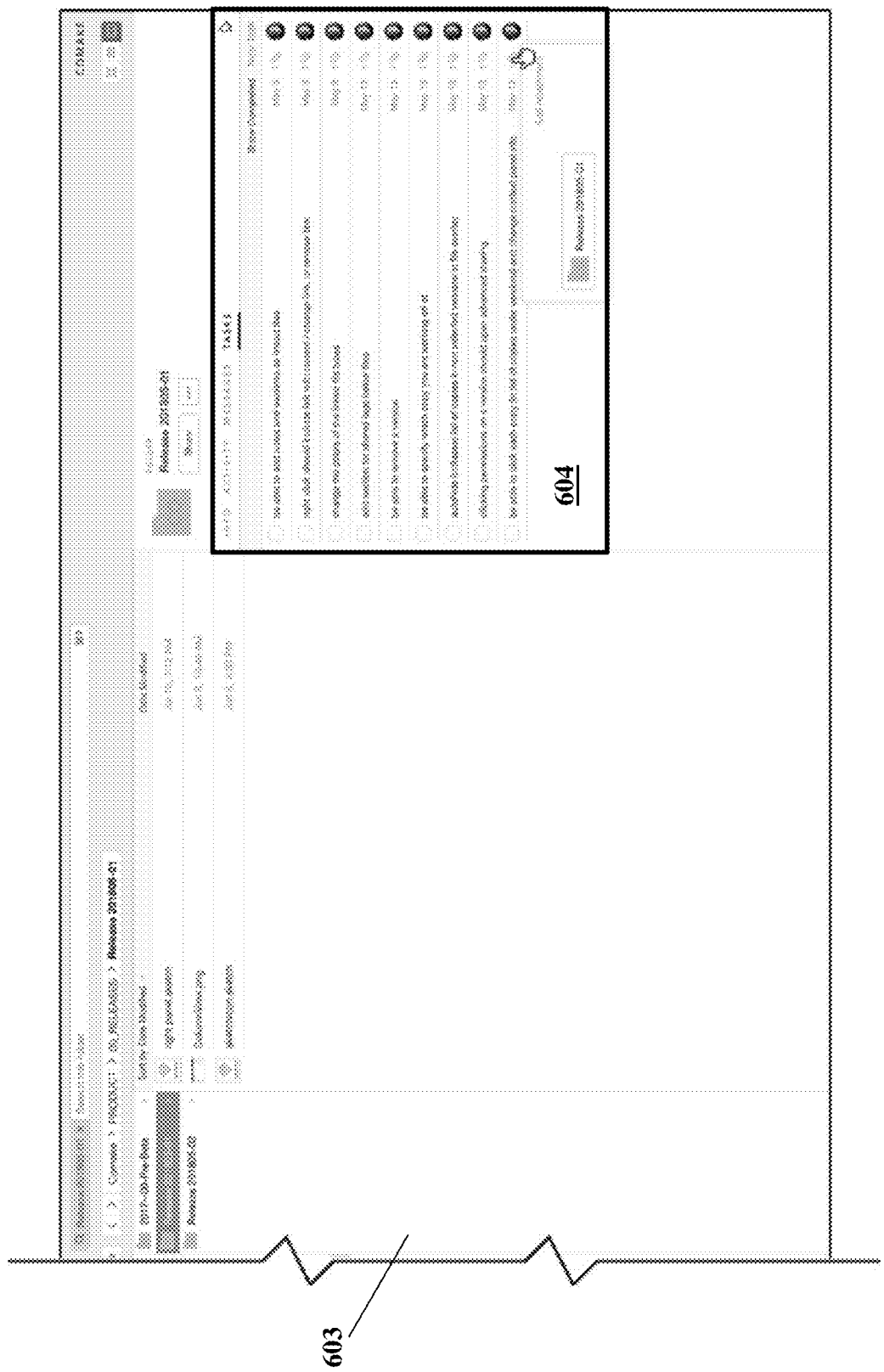
FIG. 6C is a graphical user interface displaying a folder and its context information, including related tasks, in accordance with an embodiment.

Referring now to FIG. 6A, another example of a graphical user interface displaying file context information is illustrated. As described above, the analytics server may incorporate a graphical user interface displaying file previews and context information into a third-party application, such as a third-party email application, a third-party file sharing application, or a third-party project management tool. Additionally or alternatively, the analytics server may generate a web-based application (e.g., a website) and/or native desktop and mobile application where registered users can login to access and/or manage different files. The web-based application may incorporate other third-party applications, such as email applications.

GUI 600 represents a graphical user interface generated and operatively controlled by the analytics server. In the depicted embodiment, the analytics server incorporates data from third-party email and messaging applications into the GUI 600. For instance, GUI 600 corresponds to a user who has previously registered and connected his or her third-party email and Slack® account. As a result, the analytics server updates the graphical component 610 in real time by continuously querying the third-party email, messaging, project management, and cloud storage applications and populating the graphical component 610. The GUI 600 depicts an example where a registered user has requested to access File XYZ by searching for the File XYZ using the search bar 690. As described above, the analytics server may perform the search using a search platform (e.g., Solr®), which maintains an index of all files, messages, tasks, and more across all of the data repositories including all third-party data sources. In some embodiments, the analytics server may augment the search results through an understanding of the interconnected nature of the nodes (e.g., how interconnected are the nodes). For example, the analytics server may execute a predetermined ranking algorithm and display the search results accordingly. Upon identifying File XYZ (by identifying a node that represents File XYZ within a nodal data structure), the analytics server populates the graphical component 620 that displays a "quick view" of the file XYZ.

The GUI 600 may also comprise a graphical component 640 that includes interactive hyperlinks/components where a user can open File XYZ or change the file's user permission and share a link directing recipients to access File XYZ. In this illustrative user interface, the graphical component 640 includes hyperlinks for info, messages, tasks, and timeline. Activating the info hyperlink can display information such as timestamp, author, version number, or the like. Activating the messages hyperlink, as shown in FIG. 6A, can display messages containing File XYZ. Activating the tasks hyperlink can display tasks that contain or are related to File XYZ. Activating the timeline hyperlink can display a listing of chronological events and related projects associated with File XYZ. The GUI 600, including graphical component 640, thereby allows a user to consolidate and manage all updates, notifications, contacts, messages, tasks, and content on a single user interface in a more user-friendly manner.

The GUI 600 further includes a graphical component 630, which indicates suggested related files. In some configurations, the analytics server may display the suggested related files, as shown in graphical component 630. The suggested related files may be sorted based on different customizable categories. For instance, as depicted, related files may be sorted based on file type. The graphical component 630 may also include "quick view" access to different versions of File XYZ. For instance, graphical component 630 comprises version 631 from Oct. 26, 2018, version 632 from Oct. 28, 2018, and version 633 from Oct. 1, 2018.

The GUI 600 further includes a message history of File XYZ, as illustrated by the graphical component 650-680. As described above, each graphical component within the GUI 600 may comprise an interactive component configured to direct the user to a file, a message, a task, or a person related to File XYZ. The timeline tab includes a history of all user activity events related to File XYZ and all of its versions, including but not limited to email messages, edits, downloads, and views.

For instance, the graphical component 660 indicates that File XYZ is associated with 12 comments on a third-party messaging application. When the user clicks or otherwise interacts with the graphical component 660, the analytics server displays each comment on the GUI 600. The user can easily respond to comments from any third-party system (e.g., a task management application) in which the file was uploaded to, or used in a chat conversation. In another example, when the user interacts with the graphical component 650, the analytics server displays the email communication between the user and John Smith. For instance, when a user interacts with the graphical component 650, the analytics server may display a new graphical user interface 601. The analytics server may use a unique email identifier to retrieve the email via IMAP and/or API calls and to display the related email message or thread in full, as shown in graphical component 602. Using the features displayed in graphical component 602, the user may be able to respond in line, and click and drag other versions and/or related files into the message to attach them. In another example, when the user interacts with "task" option in the graphical component 640, the analytics server may display the GUI 604 where the graphical component 604 displays different tasks related to the requested file (e.g., tasks that have a file or folder as an attachment).

In a non-limiting example, the analytics server scans data accessible to all computers within a company where the data is stored onto multiple electronic repositories. Upon identifying all files stored onto different electronic repositories, the analytics server executes a hashing protocol for each identified file to generate a unique identifier for each file. For references to files or websites (e.g. links shared in email messages, website bookmarks, file shortcuts, etc.), the analytics server identifies different unique identifiers such as file path, a URL, or a third-party party system's unique ID. The analytics server further creates a nodal data structure where each node represents an identified file and contains metadata indicating data associated with each file. The analytics server further compares the unique identifiers for all the identified files. When two files have matching unique identifiers, the analytics server updates the nodal data structure by linking the nodes representing the two files as copies of one another. The analytics server further scans other data sources with varied metadata like messaging systems, task management tools, etc. and updates the nodal structure to relate multiple files that share emails, messages, tasks, and activity events for example. The analytics server periodically scans the electronic repositories and iteratively updates/revises the nodal data structure based on comparing unique identifiers of all the files and linking appropriate nodes. When a user operating a computer within the company requests to access a file, the analytics server retrieves the nodal data structure and identifies a node representing the requested file. The analytics server also identifies related nodes and context data stored on the node's (representing the requested file) metadata. The analytics server then displays detailed information associated with the requested file. For instance, the analytics server displays all the versions (including a latest version) of the requested file, related files, related tasks, related people, email communication related to the requested file, and the like.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
periodically scanning, by a server, a plurality of electronic data repositories accessible to a plurality of computing devices to identify a plurality of files stored onto the plurality of electronic data repositories where each file is accessible to at least one computing device within the plurality of computing devices;
executing, by the server, a predetermined protocol to generate at least one unique identifier of each file within the plurality of files;
generating, by the server, a computer model comprising a set of nodes where each node comprises metadata indicating context data of each file within the plurality of files, wherein when a first unique identifier of a first file matches a second unique identifier of a second file, the server merges a first node corresponding to the first file with a second node corresponding to the second file, wherein the merging comprises at least one of linking the first node to the second node and combining the metadata associated with the first node with the metadata associated with the second node;
periodically scanning, by the server the plurality of electronic data repositories, to monitor the first file and the second file;
for each instance of the server detecting a related file to the first file:
merging, by the server, a third node corresponding to the related file to the first file with the first node; and
in response to receiving, from an electronic client device, a request to access the first file or the second file, transmitting, by the server, the first file, the identified related file to the first file, and the second file to the electronic client device.

2. The method of claim 1, wherein the server monitors the first file and the second file by causing an application programming interface associated with at least one of the first file and the second file to transmit a revision status of at least one of the first file and the second file.

3. The method of claim 1, wherein the server displays metadata associated with the first file, the second file, and the related file to the first file on a single view of a graphical user interface displayed on the electronic client device.

4. The method of claim 1, wherein the context data of each node comprises at least one of storage location, timestamp, revision history, an indicator of each user who has previously accessed the file represented by each node, a mime type, collaboration information, viewing permission, and a title of each file.

5. The method of claim 1, wherein when the server identifies a plurality of related files to the first file, the server displays the plurality of related files on a graphical user interface of the electronic client device where the plurality of related files are ranked in accordance with a predetermined ranking algorithm, wherein the server displays a consolidated activity timeline associated with the plurality of related files.

6. The method of claim 1, wherein the server displays a graphical user interface displaying context information regarding the latest versions of the first or the second file.

7. The method of claim 6, wherein the server identifies the related file to the first file by comparing metadata associated with the related file to the first file with metadata associated with the first file.

8. The method of claim 7, wherein the metadata contains a unique identifier associated with one or more elements associated with the related file to the first file and the first file.

9. The method of claim 6, wherein the graphical user interface comprises an interactive graphical component where when a user operating the client device interacts with the interactive graphical component, the server stops monitoring the first file or the second file.

10. The method of claim 1, the plurality of electronic data repositories comprises at least one of a database, a shared drive, cloud data storage, a third-party file sharing application, and an electronic communication application.

11. The method of claim 1, wherein the predetermined protocol is hashing protocol.

12. The method of claim 1, wherein the unique identifier for each file is based on at least one of a unique identifier of an email identifier associated with each file, a unique identifier of a task identifier associated with each file, a unique identifier of a communication identifier associated with each file, a unique identifier of a storage location identifier associated with each file, and a web URL associated with each file.

13. A computer system comprising:
a plurality of electronic data repositories storing a plurality of files;
a plurality of computing devices in communication with the plurality of electronic data repositories;
a server in communication with the plurality of electronic data repositories and the plurality of computing devices, the server configured to:
periodically scan the plurality of electronic data repositories to identify a plurality of files stored onto the plurality of electronic data repositories where each file is accessible to at least one computing device within the plurality of computing devices;
execute a predetermined protocol to generate a unique identifier of each file within the plurality of files;
generate a computer model comprising a set of nodes where each node comprises metadata indicating context data of each file within the plurality of files, wherein when a first unique identifier of a first file matches a second unique identifier of a second file, the server merges a first node corresponding to the first file with a second node corresponding to the second file, wherein the merging comprises at least one of linking the first node to the to the second and combining the metadata associated with the first node with the metadata associated with the second node;
periodically scan, the plurality of electronic data repositories, to monitor the first file and the second file;
for each instance of the server detecting a related file to the first file:
merge a third node corresponding to the related file to the first file with the first node; and
in response to receiving, from an electronic client device, a request to access the first file or the second file, transmit the first file, the identified related file to the first file, and the second file to the electronic client device.

14. The computer system of claim 13, wherein the server monitors the first file and the second file by causing an application programming interface associated with at least one of the first file and the second file to transmit a revision status of at least one of the first file and the second file.

15. The computer system of claim 13, wherein the server displays metadata associated with the first file, the second file, and the related file to the first file on a single view of a graphical user interface displayed on the electronic client device.

16. The computer system of claim 13, wherein the context data of each node comprises at least one of storage location, timestamp, revision history, an indicator of each user who has previously accessed the file represented by each node, a mime type, collaboration information, viewing permission, and a title of each file.

17. The computer system of claim 13, when the server identifies a plurality of related files to the first file, the server displays the plurality of related files on a graphical user interface of the electronic client device where the plurality of related files are ranked in accordance with a predetermined ranking algorithm, wherein the server displays a consolidated activity timeline associated with the plurality of related files.

18. The computer system of claim 13, wherein the server displays a graphical user interface displaying context information regarding the latest versions of the first or the second file.

19. The computer system of claim 13, wherein the predetermined protocol is hashing protocol.

20. The computer system of claim 13, wherein the unique identifier for each file is based on at least one of a unique identifier of an email identifier associated with each file, a unique identifier of a task identifier associated with each file, a unique identifier of a communication identifier associated with each file, a unique identifier of a storage location identifier associated with each file, and a web URL associated with each file.

* * * * *